(12) United States Patent
Baird

(10) Patent No.: US 7,870,870 B2
(45) Date of Patent: Jan. 18, 2011

(54) MULTIPORT VERTICAL AXIAL VALVE WITH SEALING ROTOR

(75) Inventor: Lance A. Baird, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 820 days.

(21) Appl. No.: 11/841,181

(22) Filed: Aug. 20, 2007

(65) Prior Publication Data

US 2009/0050221 A1     Feb. 26, 2009

(51) Int. Cl.
*F16K 11/083*     (2006.01)

(52) U.S. Cl. .......................... 137/625.47; 137/625.11; 210/284

(58) Field of Classification Search ............... 137/580, 137/625.16, 625.19, 625.47; 210/278, 284, 210/290, 676
See application file for complete search history.

(56) References Cited

U.S. PATENT DOCUMENTS

| | | | | |
|---|---|---|---|---|
| 1,823,599 | A * | 9/1931 | Mooshy ................. | 137/625.16 |
| 2,985,589 | A | 5/1961 | Broughton et al. ............ | 210/34 |
| 3,040,777 | A | 6/1962 | Carson et al. .......... | 137/625.15 |
| 3,192,954 | A * | 7/1965 | Gerhold et al. ........ | 137/625.11 |
| 3,201,491 | A | 8/1965 | Stine et al. .................. | 260/676 |
| 3,814,129 | A * | 6/1974 | Cioffi .................... | 137/625.11 |
| 3,977,434 | A | 8/1976 | Albright et al. | |
| 4,162,882 | A * | 7/1979 | Rose ....................... | 425/382 R |
| 4,319,929 | A | 3/1982 | Fickel ........................ | 127/46.2 |
| 4,385,746 | A | 5/1983 | Tomlin et al. | |
| 4,574,840 | A * | 3/1986 | Schumann et al. ..... | 137/625.15 |
| 4,923,616 | A * | 5/1990 | Hirata et al. ................. | 210/676 |
| 5,069,883 | A * | 12/1991 | Matonte .................... | 422/269 |
| 5,105,851 | A * | 4/1992 | Fogelman .............. | 137/625.11 |
| 5,343,893 | A * | 9/1994 | Hogan et al. ........... | 137/624.13 |
| 5,848,611 | A * | 12/1998 | Stanevich .............. | 137/625.47 |
| 6,158,465 | A * | 12/2000 | Lambert et al. ........ | 137/625.16 |
| 6,802,970 | B2 | 10/2004 | Rochette .................... | 210/264 |
| 6,904,936 | B2 | 6/2005 | Ma ........................ | 137/625.47 |

FOREIGN PATENT DOCUMENTS

JP     06-011056 A     1/1994

* cited by examiner

*Primary Examiner*—John Fox
(74) *Attorney, Agent, or Firm*—David J Piasecki

(57) ABSTRACT

This invention discloses an axial multiport rotary valve capable of accomplishing the simultaneous interconnection of a plurality of conduits in accordance with a previously determined cycle, where any conduit communicates with no more than one other conduit at any one cycle step, or valve index position. The rotary valve comprises a hollow stator element and a rotor element inside the hollow interior of the stator element which rotates with a substantially vertical axis of rotation within the stator element, the surfaces of both elements being in the form essentially of a frustum of an inverted cone. Bed-line ports in the stator and rotor have a non-circular shape with a greater dimension in the vertical plane for higher capacities than provided in the known art.

19 Claims, 4 Drawing Sheets

US 7,870,870 B2

MULTIPORT VERTICAL AXIAL VALVE WITH SEALING ROTOR

FIELD OF THE INVENTION

This invention relates to an apparatus for distributing a plurality of fluid streams among a variety of destinations. More specifically, it relates to a unitary multiport vertical axial valve which is capable of effecting the simultaneous interconnection of a plurality of conduits in accordance with a predetermined periodic sequence.

GENERAL BACKGROUND AND RELATED ART

The separation of various substances through selective adsorption may be effected using a simulated moving bed of adsorbent, such as that described in U.S. Pat. No. 2,985,589. In accomplishing this simulation, it is necessary to connect streams entering and exiting a series of beds in a sequential pattern. These beds may be considered to be portions of a single large bed whose movement is simulated by the movement of the entry or exit points of each of the streams. Each time one stream destination is changed, the destinations or origins of other related streams, which may be streams entering the beds or leaving the beds, is changed simultaneously. The moving-bed simulation may be described simply as dividing the bed into a series of fixed beds and moving the points of introducing and withdrawing liquid streams past the series of fixed beds instead of moving the beds past the introduction and withdrawal points of such streams.

It is highly desirable to use a single device to simultaneously transfer all of the fluid streams, thereby avoiding the obvious problems associated with numerous separate valves which must be simultaneously actuated. The multiport rotary disc valve of U.S. Pat. No. 3,040,777 provides a valve design to effect a simulated moving bed. This valve effects simultaneous interconnection of conduits which provide the streams entering and leaving the simulated-moving-bed adsorption system with the conduits associated with the individual beds which supply and remove streams to and from the beds in which one conduit is connected between each two beds. It is to be noted that each conduit of the second group serves that dual function of supply and removal, so that it is unnecessary to provide conduits for supplying streams separate from those for removing streams.

There are variations in process requirements in different moving bed simulation processes, resulting in different flow schemes and thus variations in rotary valve arrangement. For example, in addition to the four basic streams described in U.S. Pat. No. 2,985,589, it may be desirable to utilize one or more streams to purge, or flush, a conduit to prevent undesirable mixing of components. U.S. Pat. No. 3,201,491 provides information on flushing lines as applied to the simulated-moving-bed process. Passing fluid through a bed or beds in the reverse direction from normal flow, commonly known as backflushing, is treated in U.S. Pat. No. 4,319,929. Relevant portions of all of the foregoing patents are incorporated herein by reference thereto.

U.S. Pat. No. 4,574,840 discloses a multiport axial valve having a rotor assembly inside a stator assembly. The stator assembly comprises a central element and two end elements, each of which has a cylindrical form, with the central element having transverse surfaces perpendicular to the longitudinal axis of rotation. The rotor assembly comprises a spacer element between two end elements, effecting annular volumes between rotor and stator end elements and transverse volumes between the stator central element and rotor end elements, configured such that axial forces exerted by fluid streams balance the rotor assembly. However, this reference does not suggest the seating surfaces or port configurations of the present invention.

U.S. Pat. No. 6,802,970 B2 teaches a distributing device comprising a revolving disc mounted in a stationary housing in sealing engagement. Feed pipes and discharge pipes open into passageways via at least one ring-shaped duct in a closed circle around the axis of rotation. This reference differs from the present invention in the configuration of the rotor, and does not suggest the port configuration central to the present invention.

U.S. Pat. No. 6,904,936 discloses a rotary valve having a stator of barrel shape with first ports spaced longitudinally along the lateral structure and second ports at the bottom around the axis of the stator and a rotor having a hollow shaft section with longitudinally spaced top openings, a plurality of flow passages, and bottom openings spaced consistently with those of the stator; a plurality of ring structures between the stator and rotor forming a circular groove between two adjacent ring structures for fluid communication in a sequential and cyclic manner. The arrangement of ports differs from that described herein and does not suggest the configuration of the present invention.

With the widespread commercial acceptance of simulated-moving-bed processes using multiport rotary disc valves as described in the known art, single process units currently are being designed and/or contemplated with capacities which require two or more rotary valves. A valve design according to the present invention in which a single unit is effective at increased capacities provides significant economies of scale.

BRIEF SUMMARY OF THE INVENTION

A broad embodiment of the invention is an axial multiport rotary valve for effecting the simultaneous interconnection of a plurality of conduits in a previously determined sequential cycle which comprises a stator element having a hollow interior stator seating surface in the form essentially of the frustum of an inverted cone, comprising two or more stator process-line ports connected to external-stream conduits and a plurality of stator bed-line ports connected to stator bed-line conduits, the stator bed-line ports having a non-circular form with a greater dimension in the vertical plane and being arranged in a circumferential pattern in the stator seating surface; a rotor element positioned substantially inside the hollow interior of the stator element and which rotates with a substantially vertical axis of rotation within the stator element, the rotor element having an exterior rotor seating surface tapered in a form essentially of a frustum of an inverted cone in fluid-tight contact with the stator seating surface and further comprising two or more rotor process-line ports each corresponding with one stator process-line port and connected by an interior channel to a rotor bed-line port, each of the rotor bed-line ports having a non-circular form with a greater dimension in the vertical plane and communicating with a stator bed-line port in accordance with the previously determined cycle; and, channel means in one or both of the stator element and rotor element to enable continuous communication between each stator process-line port and the corresponding rotor process-line port.

A more specific embodiment is an axial multiport rotary valve for effecting the simultaneous interconnection of a plurality of conduits in a previously determined sequential cycle which comprises a stator element having a hollow interior stator seating surface in the form essentially of the frustum of an inverted cone, comprising two or more stator process-line ports arranged in a circumferential pattern in the stator seating surface and connected to external process conduits and a plurality of stator bed-line ports connected to stator bed-line conduits, the stator bed-line ports having a non-circular form with a greater dimension in the vertical plane and being arranged in a circumferential pattern in the stator seating surface; a rotor element positioned substantially inside the hollow interior of the stator element and which rotates with a substantially vertical axis of rotation within the stator element, the rotor element having an exterior rotor seating surface tapered in a form essentially of a frustum of an inverted cone in fluid-tight contact with the stator seating surface and further comprising two or more rotor process-line ports arranged in a circumferential pattern in the rotor seating surface and each corresponding with one stator process-line port and connected by an interior channel to a rotor bed-line port, each of the rotor bed-line ports having a non-circular form with a greater dimension in the vertical plane and communicating with a stator bed-line port in accordance with the previously determined cycle; and, channel means in one or both of the stator element and rotor element to enable continuous communication between each stator process-line port and the corresponding rotor process-line port.

An alternative specific embodiment is an axial multiport rotary valve for effecting the simultaneous interconnection of a plurality of conduits in a previously determined sequential cycle which comprises a stator element having a hollow interior stator seating surface comprising a substantially flat circular stator base and a directionally vertical stator segment having an internal wall in the form essentially of a frustum of an inverted cone, the surface comprising two or more stator process-line ports in the stator base connected to external process conduits and a plurality of stator bed-line ports in the vertical stator segment having a non-circular shape with a greater dimension in the vertical plane, being arranged in a circumferential pattern in the vertical segment and connected to stator bed-line conduits; a rotor element positioned substantially inside the hollow interior of the stator element and which rotates with a substantially vertical axis of rotation within the stator element, the rotor element having an exterior rotor seating surface comprising a substantially flat circular rotor base and a directionally vertical rotor segment tapered in a form essentially of a frustum of an inverted cone each in fluid-tight contact with the stator seating surface and further comprising two or more rotor process-line ports each corresponding to one stator process-line port and connected by an interior channel to a rotor bed-line port, each of the rotor bed-line ports having a non-circular shape with a greater dimension in the vertical plane and communicating with a or stator bed-line port in accordance with the previously determined cycle; and, channel means in one or both of the stator element and rotor element to enable continuous communication between each stator process-line port and the corresponding rotor process-line port.

Preferably the bed-line ports in the stator and rotor have an oblong shape with a greater dimension in the vertical plane.

DESCRIPTION OF THE PREFERRED EMBODIMENTS

The following description of embodiments of the invention are not to be construed as limiting the generally broad scope of the invention as set out in the appended claims. The skilled routineer will appreciate that elements of the invention may be arranged to provide other embodiments with wider uses than described herein. For example, the present invention is described in its application to adsorptive separation as an associated process; however, it should be apparent that it also is applicable in other processes in which a concentration gradient can be exploited to advantage such as ion exchange or other chemical processes.

Adsorptive separation is applied to the recovery of a variety of hydrocarbon and other chemical products. Chemical separations using this approach which have been disclosed include the separation of mixtures of aromatics into specific aromatic isomers, of linear from nonlinear aliphatic and olefinic hydrocarbons, of either paraffins or aromatics from a feed mixture comprising both aromatics and paraffins, of chiral compounds for use in pharmaceuticals and fine chemicals, of oxygenates such as alcohols and ethers, and of carbohydrates such as sugars. A major commercial application, which forms the focus of the prior references and of the following description of the present invention without so limiting it, is the recovery of high-purity para-xylene and/or meta-xylene from mixtures of $C_8$ aromatics which generally comprise a mixture of xylene isomers and ethylbenzene.

The invention is particularly useful in an adsorptive separation process which simulates countercurrent movement of the adsorbent and surrounding liquid as described in patents mentioned hereinabove, but it may also be practiced in a concurrent continuous process such as that disclosed in U.S. Pat. Nos. 4,402,832 and 4,478,721, incorporated herein by reference thereto. Countercurrent moving-bed or simulated-moving-bed countercurrent flow systems have a much greater separation efficiency for such separations than fixed-bed systems, as adsorption and desorption operations are continuously taking place with a continuous feed stream and continuous production of extract and raffinate. A thorough explanation of simulated-moving-bed processes is given in the Adsorptive Separation section of the Kirk-Othmer Encyclopedia of Chemical Technology at page 563.

Figure 1:
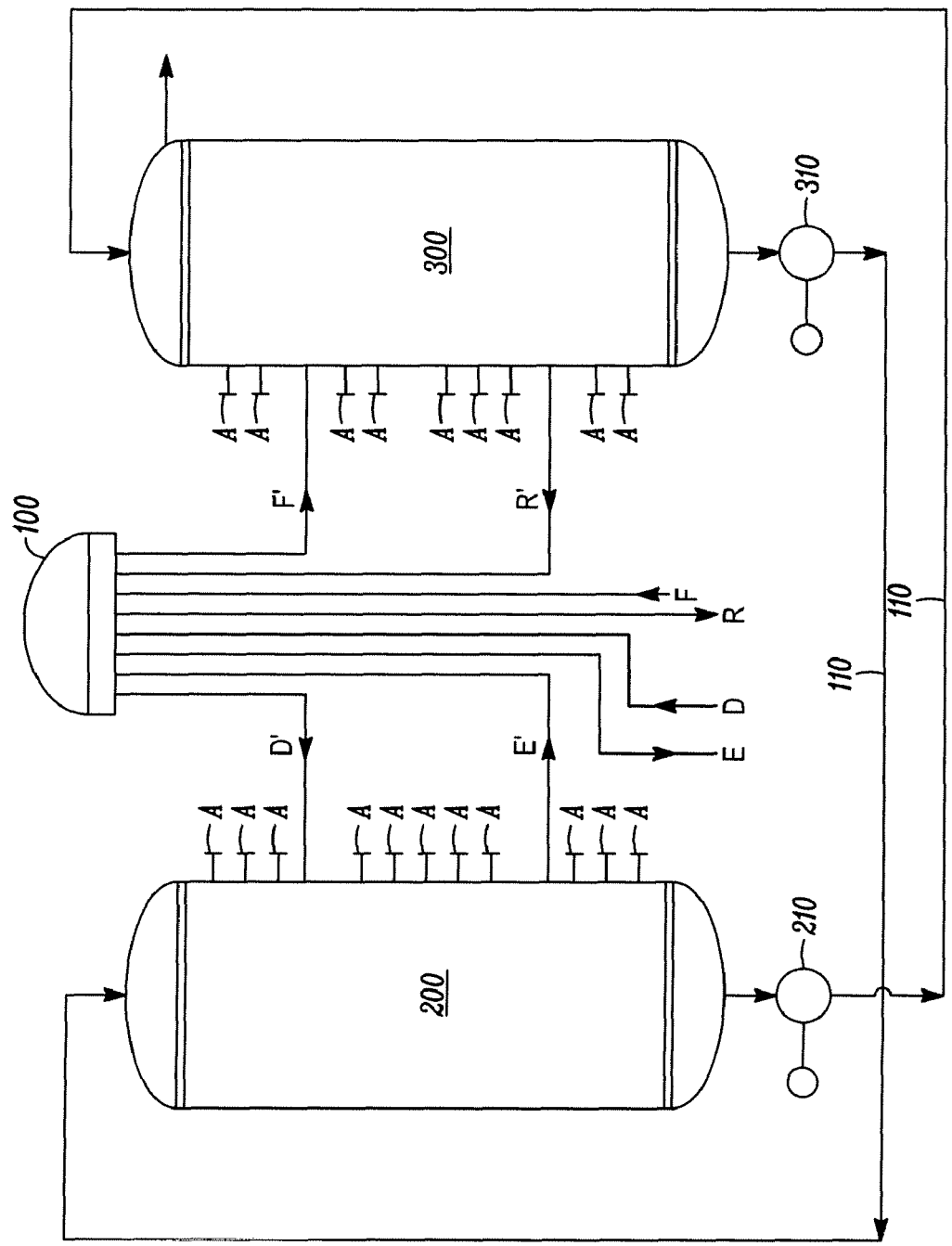
FIG. 1 is a schematic drawing depicting the use of a rotary valve in an adsorptive separation process.

FIG. 1 is a schematic diagram of a simulated-moving-bed adsorption process employing the present invention. Streams F, D, E and R in external-stream conduits are distributed by valve 100 of the invention to and from an associated adsorption process. The adsorbent in a simulated-moving-bed adsorption process is contained in multiple beds in one or more vessels; two vessels 200 and 300 in series are shown in the drawing. Bed-line conduits connect the valve to the adsorbent beds, and the process sequentially contacts a feed stream F' with adsorbent and a desorbent D' to separate an extract stream E' from a raffinate stream R'. In the simulated-moving-bed countercurrent flow system, progressive shifting of multiple liquid feed and product access points down through the beds simulates the upward movement of adsorbent contained in the chamber. Each of the multiple beds of adsorbent relates to one of access points A, and the position of streams F', D', E' and R' are shifted by the rotary valve along the access points to simulate a moving adsorbent bed. Circulating liquid 110 comprising desorbent, extract and raffinate, which changes in composition through the beds, circulates through the vessels through pumps 110 and 210. Systems to control the flow of circulating liquid are described in U.S. Pat. No. 5,595,665, but the particulars of such systems are not essential to the present invention. The system preferably utilizes one or more flush streams as described inter alia in U.S. Pat. No. 3,201,491.

Figure 2:
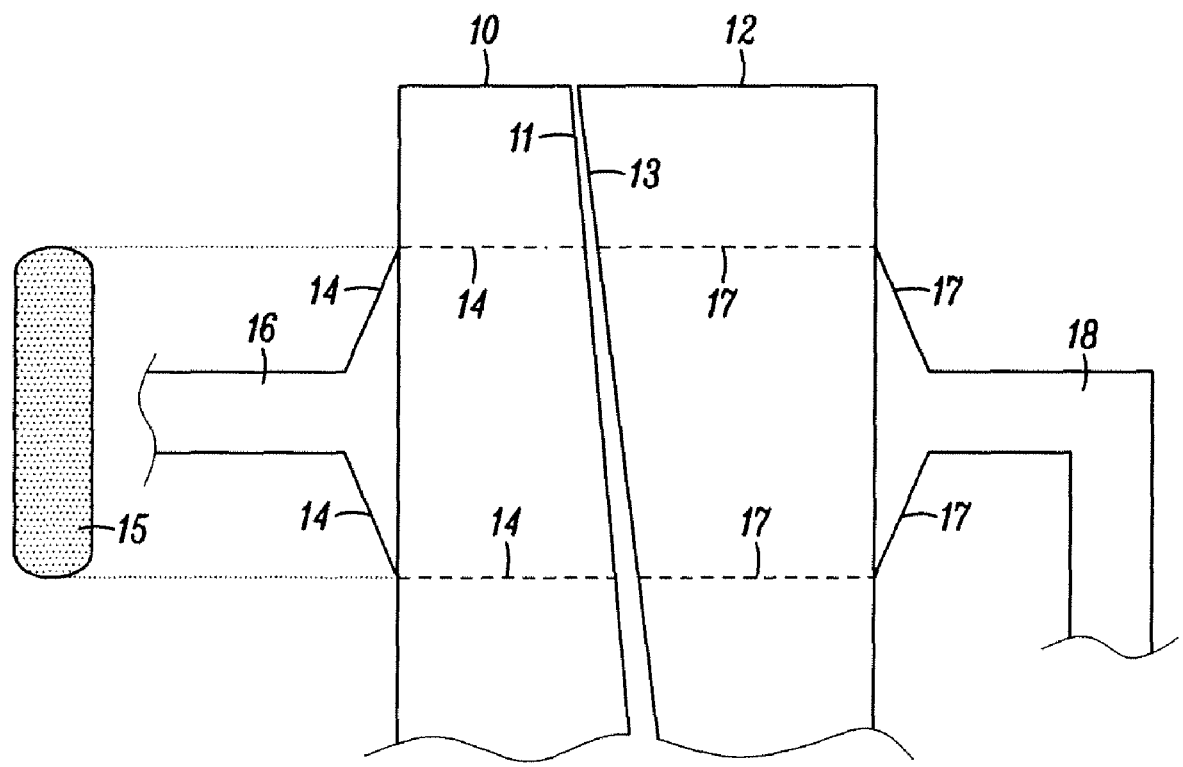
FIG. 2 is a schematic cross-section of one side of a multiport vertical axial rotary valve of the invention.

A schematic cross-section of one side of the valve of the invention is shown in FIG. 2. The broad invention comprises a stator element 10 having a hollow interior seating surface 11 and a rotor element 12 positioned substantially inside the interior of the stator element and having an exterior rotor seating surface 13. Each of the stator interior seating surface and the rotor seating surface are in a form essentially of a frustum of an inverted cone such that the two seating surfaces are in fluid-tight contact. The fluid-tight contact preferably comprises one or both of an elastomeric material and a lubricious polymeric material as would be known to the skilled routineer. One example 14 of a plurality of stator bed-line ports is shown with a projection 15 of the surface configuration of the port in the horizontal plane. The port is of a non-circular form with a greater dimension in the vertical plane, permitting a greater capacity of fluid to pass through the port for a given valve diameter in the horizontal plane than if the port were of circular form. The stator bed-line port communicates with a stator bed-line conduit 16. One example 17 of a plurality of substantially identical rotor bed-line ports has essentially the same configuration as the stator bed-line port and communicates with the stator bed-line port across the fluid-tight contact of the respective seating surfaces. The stator bed-line ports and rotor bed-line ports are located in a communicating array respectively around the circumference of the stator and rotor, with the number of active rotor bed-line ports being determined by the number of streams (such as process and flush streams) being distributed by the valve. Inactive bed-line ports generally are prevented from communicating with other bed ports by the fluid-tight contact of the stator and rotor. The indicated active rotor bed-line port communicates through an interior channel 18 with a stator process-line port as discussed below.

The stator and rotor bed-line ports 14 and 17 thus have a greater dimension in the vertical plane than in the horizontal plane. Any geometric form within this definition is within the scope of the invention, including but not limited to ellipsoidal or oblong or oval, rectangular or quadrilateral, polygonal, or irregular, with an oblong form being preferred. A form may be stabilized by an irregular configuration, for example one or more beams or struts either inserted across the narrow dimension of the port or remaining from machining of the port. Further, a given valve may be provided with greater capacity through expansion of the vertical dimensions of the plurality of ports.

The frustum form of the stator seating surfaces of the stator and rotor comprises a narrowing diameter from the top to the bottom of each element. This form enables a fluid-tight contact between the seating surfaces 11 and 13 as downward pressure is exerted on the rotor element 12. The method by which this pressure is exerted is not an element of the invention, and may comprise fluid pressure or any suitable mechanical means. The taper of the frustum may be any suitable to maintain a fluid-tight contact, but usually is within 0.1° and 10° of vertical. It is within the scope of the invention that the valve may comprise means for varying the taper.

The valve is axial, with the rotor rotating in a vertical dimension within the stator. The means and connections of the rotor in order to effect rotation are within the art cited above such as U.S. Pat. No. 3,040,777 incorporated herein by reference.

Figure 3:
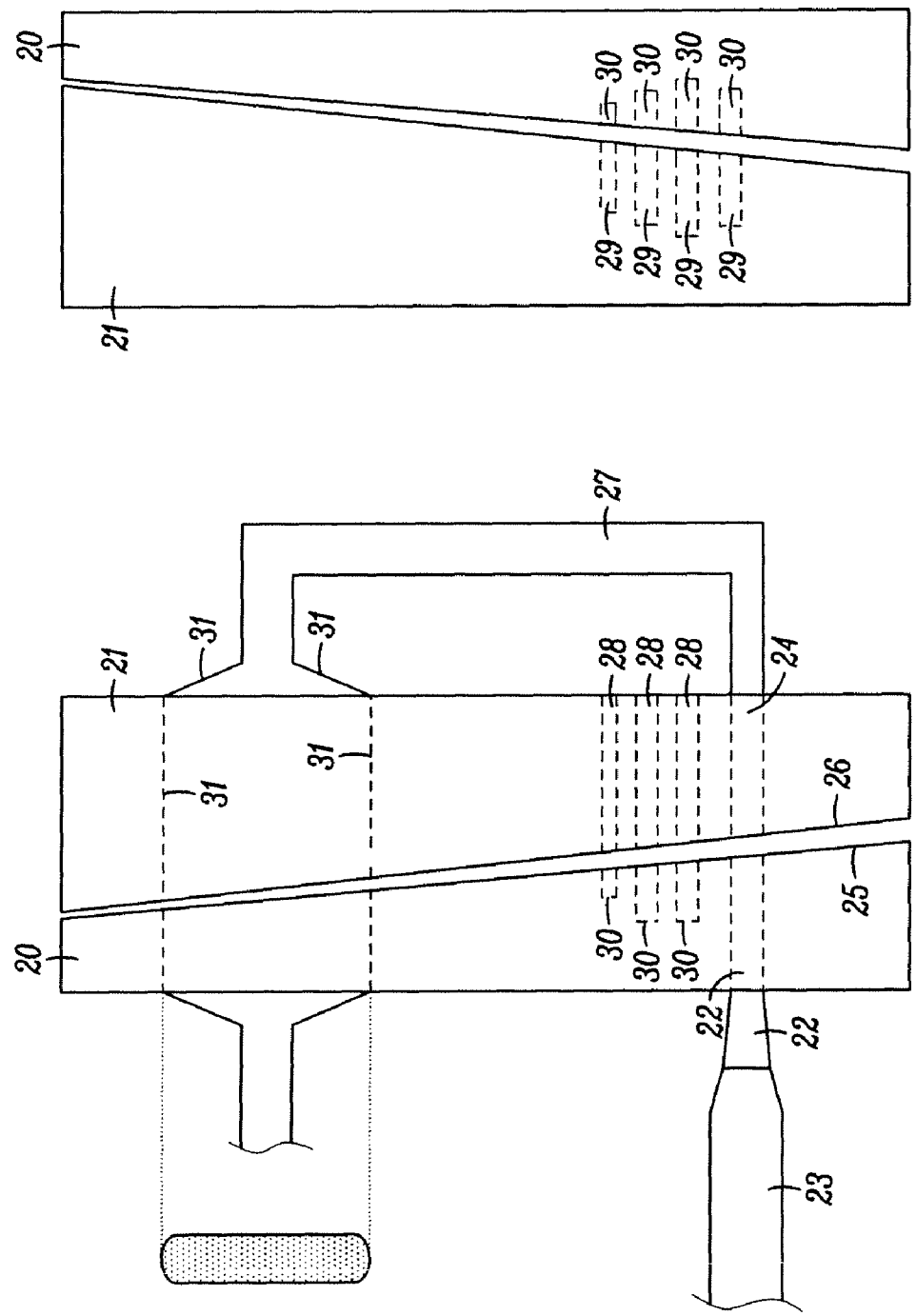
FIG. 3 is a simplified representation of a multiport vertical axial rotary valve with both process-line and bed-line ports in the vertical segment.

FIG. 3 is a cross-sectional illustration of a valve of the invention, comprising stator 20 and rotor 21, illustrating an embodiment of the invention in which stator process-line ports are arranged in a circumferential pattern in the stator seating surface. The illustration shows one stator process-line port 22 connected to an external process conduit 23, in which streams are sent to or from the valve according to FIG. 1. The stator process-line port communicates with a rotor process-line port 24 across the fluid-tight contact of the respective stator and rotor seating surfaces 25 and 26. The rotor process-line port communicates with an interior channel 27 (referenced in FIG. 2 as 18). Rotor process-line ports in other sections of the rotor for other streams sent to or from the rotor are indicated as 28; each of these communicates with a stator process-line port in the same manner as 22 and 24 described previously. Rotor channels 29 extend around the circumference of the rotor seating surface to enable continuous communication of the rotor port with the respective stator port. In the same manner, stator channels 30 extend around the circumference of the stator seating surface to enable continuous communication of the respective stator and rotor ports. Such channels may be in the seating surfaces of either or both the stator and rotor.

Referring again to FIG. 3, the interior channel 27 communicates with rotor bed-line port 31. The rotor bed-line port communicates across the fluid-tight contact of the rotor and stator with a stator bed-line port and bed-line conduit as described for FIG. 2 (#s 14,15,16), with the port having a non-circular form.

Figure 4:
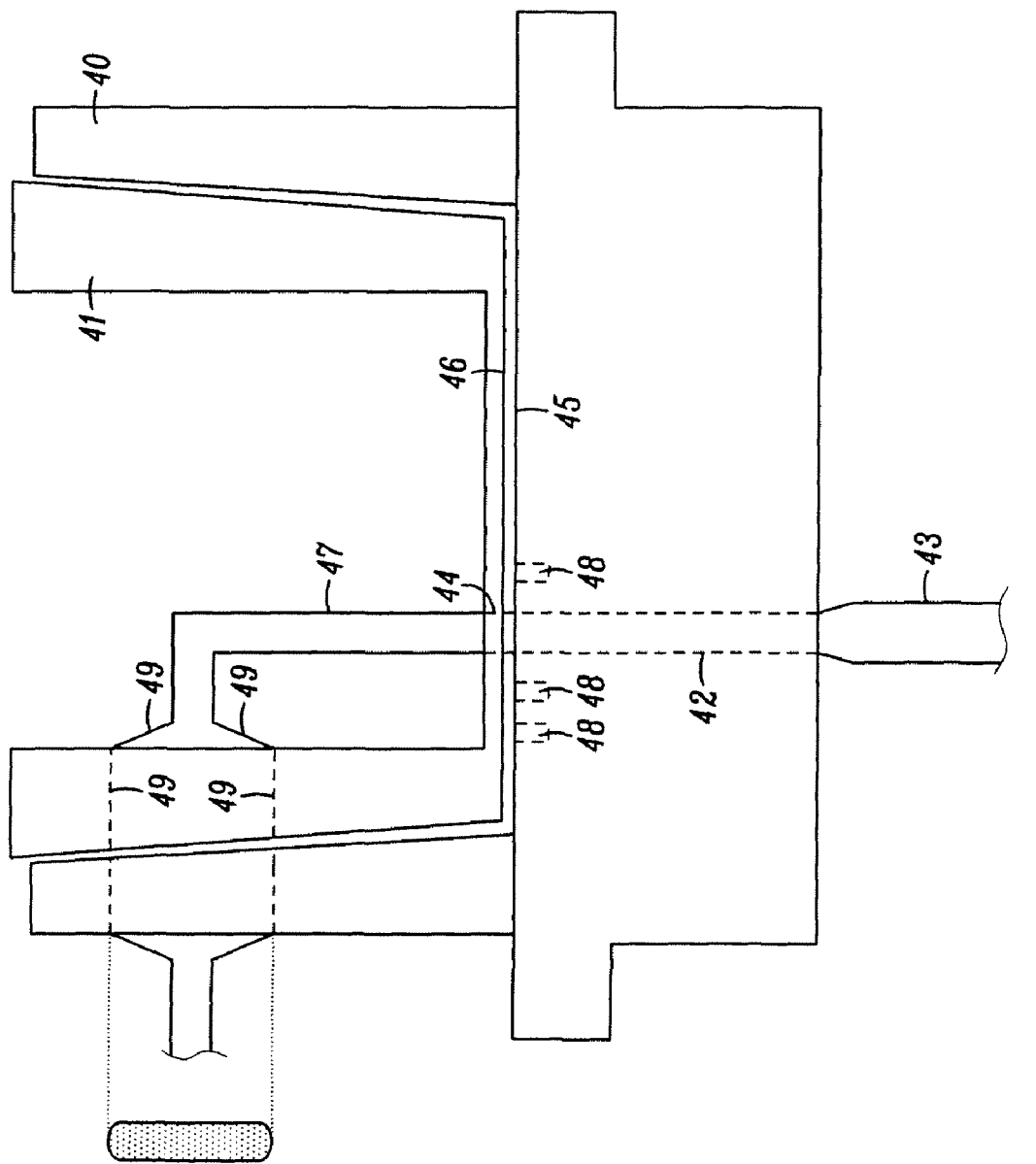
FIG. 4 depicts am arrangement of the process-line ports in the base of a multiport vertical axial rotary valve.

FIG. 4 is a cross-sectional illustration of an alternative valve of the invention, comprising stator 40 and rotor 41, illustrating an embodiment of the invention in which stator process-line ports are arranged in a circular pattern in a flat circular stator base. The illustration shows one stator process-line port 42 connected to an external process conduit 43, in which streams are sent to or from the valve according to FIG. 1. The stator process-line port communicates with a rotor process-line port 44 across the fluid-tight contact of the respective stator and rotor seating surfaces 45 and 46. The rotor process-line port communicates with an interior channel 47 (referenced in FIG. 2 as 18). Other stator process-line ports communicates with a rotor process-line port in the same manner as 42 and 44 described previously. Stator channels 48 extend around the stator base in a circular pattern to enable continuous communication of the respective stator and rotor ports; such channels may be in the seating surfaces of either or both the stator and rotor. The interior channel 47 communicates with rotor bed-line port 49. The rotor bed-line port communicates across the fluid-tight contact of the rotor and stator with a stator bed-line port and bed-line conduit as described for FIG. 2 (#s 14,15,16), with the port having a non-circular form.

It is important that the rotor seating surface comprises means to effect fluid-tight contact with the stator base. Such means may comprise, but is not limited to, a fluid under pressure and seating springs. Further details are contained in U.S. Pat. No. 3,040,777 and derivative patents.

A rotary valve indexes by moving the rotor element to place stator and rotor ports in communication. A valve index position refers to one of the positions of a rotor element which is stationary and where openings are in register.

The components of the present invention may be fabricated from suitable materials of construction, such as metals or plastics, known to the skilled routineer. Conduits may be connected to stator ports by any means including flanged nozzles and directly by welding, the stator wall being configured to accept welded-on conduits.

The invention claimed is:

1. An axial multiport rotary valve for effecting the simultaneous interconnection of a plurality of conduits in a previously determined sequential cycle which comprises:
    (a) a stator element having a hollow interior stator seating surface in the form essentially of the frustum of an inverted cone, comprising two or more stator process-line ports connected to external-stream conduits and a plurality of stator bed-line ports connected to stator bed-line conduits, the stator bed-line ports having a non-circular form with a greater dimension in the vertical plane and being arranged in a circumferential pattern in the stator seating surface;
    (b) a rotor element positioned substantially inside the hollow interior of the stator element and which rotates with a substantially vertical axis of rotation within the stator element, the rotor element having an exterior rotor seating surface tapered in a form essentially of a frustum of an inverted cone in fluid-tight contact with the stator seating surface and further comprising two or more rotor process-line ports each corresponding with one stator process-line port and connected by an interior channel to a rotor bed-line port, each of the rotor bed-line ports having a non-circular form with a greater dimension in the vertical plane and communicating with one of the stator bed-line ports in accordance with the previously determined cycle; and,
    (c) communication channels in one or both of the stator element and rotor element to enable continuous communication between each of the stator process-line ports and the corresponding rotor process-line port.

2. The rotary valve of claim 1 wherein the bed-line ports in the stator and rotor have an oblong shape with a greater dimension in the vertical plane.

3. The rotary valve of claim 1 wherein the fluid-tight contact comprises an elastomeric material.

4. The rotary valve of claim 1 wherein the fluid-tight contact comprises a lubricious polymeric material.

5. The rotary valve of claim 1 wherein the external-stream conduits convey external streams to and from the valve which distributes the streams in the sequential cycle through the stator bed-line conduits to and from an associated process.

6. An axial multiport rotary valve for effecting the simultaneous interconnection of a plurality of conduits in a previously determined sequential cycle which comprises:
    (a) a stator element having a hollow interior stator seating surface in the form essentially of the frustum of an inverted cone, comprising two or more stator process-line ports arranged in a circumferential pattern in the stator seating surface and connected to external process conduits and a plurality of stator bed-line ports connected to stator bed-line conduits, the stator bed-line ports having a non-circular form with a greater dimension in the vertical plane and being arranged in a circumferential pattern in the stator seating surface;
    (b) a rotor element positioned substantially inside the hollow interior of the stator element and which rotates with a substantially vertical axis of rotation within the stator element, the rotor element having an exterior rotor seating surface tapered in a form essentially of a frustum of an inverted cone in fluid-tight contact with the stator seating surface and further comprising two or more rotor process-line ports arranged in a circumferential pattern in the rotor seating surface and each corresponding with one stator process-line port and connected by an interior channel to a rotor bed-line port, each of the rotor bed-line ports having a non-circular form with a greater dimension in the vertical plane and communicating with one of the stator bed-line ports in accordance with the previously determined cycle; and,
    (c) communication channels in one or both of the stator element and rotor element to enable continuous communication between each of the stator process-line ports and the corresponding rotor process-line port.

7. The rotary valve of claim 6 wherein the communication channels are in the stator element.

8. The rotary valve of claim 6 wherein the communication channels are in the rotor element.

9. The rotary valve of claim 6 wherein the bed-line ports in the stator and rotor have an oblong shape with a greater dimension in the vertical plane.

10. The rotary valve of claim 6 wherein the fluid-tight contact comprises an elastomeric material.

11. The rotary valve of claim 6 wherein the fluid-tight contact comprises a lubricious polymeric material.

12. The rotary valve of claim 6 wherein the external-stream conduits convey external streams to and from the valve which distributes the streams in the sequential cycle through the stator bed-line conduits to and from an associated process.

13. An axial multiport rotary valve for effecting the simultaneous interconnection of a plurality of conduits in a previously determined sequential cycle which comprises:
    (a) a stator element having a hollow interior stator seating surface comprising a substantially flat circular stator base and a directionally vertical stator segment having an internal wall in the form essentially of a frustum of an inverted cone, the surface comprising two or more stator process-line ports in the stator base connected to external process conduits and a plurality of stator bed-line ports in the vertical stator segment having a non-circular shape with a greater dimension in the vertical plane, being arranged in a circumferential pattern in the vertical segment and connected to stator bed-line conduits;
    (b) a rotor element positioned substantially inside the hollow interior of the stator element and which rotates with a substantially vertical axis of rotation within the stator element, the rotor element having an exterior rotor seating surface comprising a substantially flat circular rotor base and a directionally vertical rotor segment tapered in a form essentially of a frustum of an inverted cone each in fluid-tight contact with the stator seating surface and further comprising two or more rotor process-line ports each corresponding to one stator process-line port and connected by an interior channel to a rotor bed-line port, each of the rotor bed-line ports having a non-circular shape with a greater dimension in the vertical plane and communicating with one of the stator bed-line ports in accordance with the previously determined cycle; and,
    (c) communication channels in one or both of the stator element and rotor element to enable continuous communication between each of the stator process-line ports and the corresponding rotor process-line port.

14. The rotary valve of claim 13 wherein the communication channels are in the stator base.

15. The rotary valve of claim 13 wherein the communication channels are in the rotor base.

16. The rotary valve of claim 13 wherein the bed-line ports in the stator and rotor have an oblong shape with a greater dimension in the vertical plane.

17. The rotary valve of claim 13 wherein the fluid-tight contact comprises an elastomeric material.

18. The rotary valve of claim 13 wherein the fluid-tight contact comprises a lubricious polymeric material.

19. The rotary valve of claim 13 wherein the external-stream conduits convey external streams to and from the valve which distributes the streams in the sequential cycle through the stator bed-line conduits to and from an associated process.

* * * * *